United States Patent [19]

Dounies

[11] Patent Number: 5,343,509

[45] Date of Patent: Aug. 30, 1994

[54] EMERGENCY INFORMATION FACSIMILE TRANSMITTER

[76] Inventor: Gregory F. Dounies, 1221 Eighteenth St., Bakersfield, Calif. 93309

[21] Appl. No.: 753,384

[22] Filed: Aug. 30, 1991

[51] Int. Cl.$^5$ .................... H04M 1/64; H04M 11/04
[52] U.S. Cl. ........................ 379/40; 379/41; 379/69; 379/96; 358/468
[58] Field of Search .................... 379/67–70, 379/58, 84, 88, 40, 41, 42, 43, 44

[56] References Cited

U.S. PATENT DOCUMENTS

| | | | |
|---|---|---|---|
| 3,538,257 | 11/1970 | Wright, Jr. et al. | 379/69 |
| 3,595,999 | 7/1971 | Cole | 379/69 |
| 3,601,540 | 8/1971 | Bryan | 379/69 X |
| 3,617,640 | 11/1971 | Cichanowicz | 379/69 X |
| 4,371,751 | 2/1983 | Hilligan, Jr. et al. | 379/41 |
| 4,716,582 | 12/1987 | Blanchard et al. | 379/41 X |
| 4,825,457 | 4/1989 | Lebowitz | 379/40 |
| 4,829,559 | 5/1989 | Izawa et al. | 379/70 X |
| 4,872,195 | 10/1989 | Leonard | 379/41 X |

FOREIGN PATENT DOCUMENTS

| | | | |
|---|---|---|---|
| 0197950 | 11/1983 | Japan | 379/69 |
| 0024556 | 1/1989 | Japan | 379/69 |
| 0188057 | 7/1990 | Japan | 379/69 |

Primary Examiner—Stuart S. Levy
Assistant Examiner—Jefferson Evans
Attorney, Agent, or Firm—Christie, Parker & Hale

[57] ABSTRACT

An emergency message is communicated from a remote location to an emergency service facility. An emergency message is fed, preferably in graphic format, to a facsimile machine at a remote location. The facsimile machine has an output at which the message appears as an electrical signal. The output of the facsimile machine is coupled to external memory means at the remote location to store the message in the memory means in the form of the electrical signal. A telephone number for the emergency service facility is also stored in the memory means. A receiving facsimile is connected to the telephone system at the emergency service facility. The telephone number stored in the memory means is dialed up responsive to a user command. The message stored in the memory means is transmitted over the telephone system to the receiving facsimile after dial up.

6 Claims, 6 Drawing Sheets

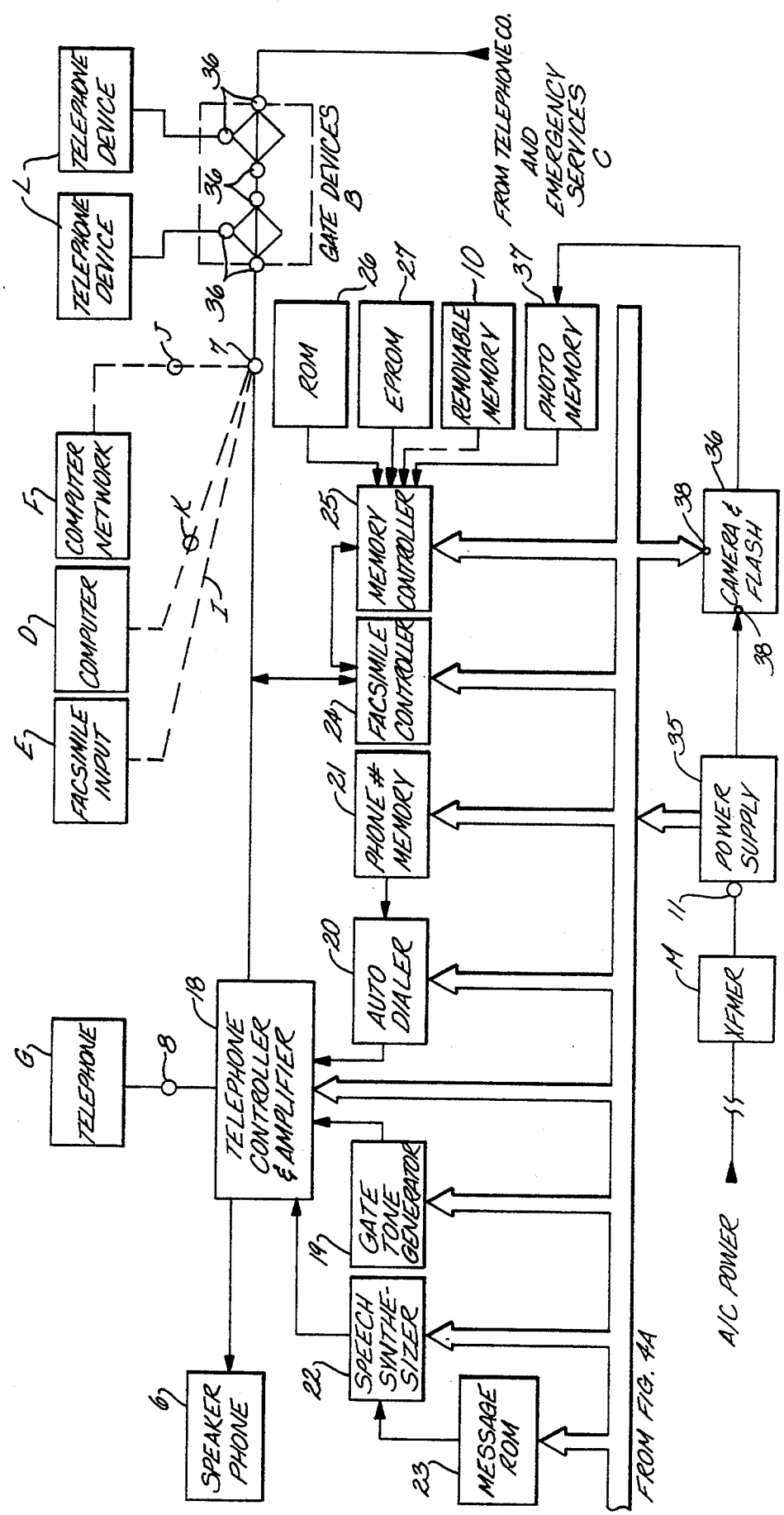

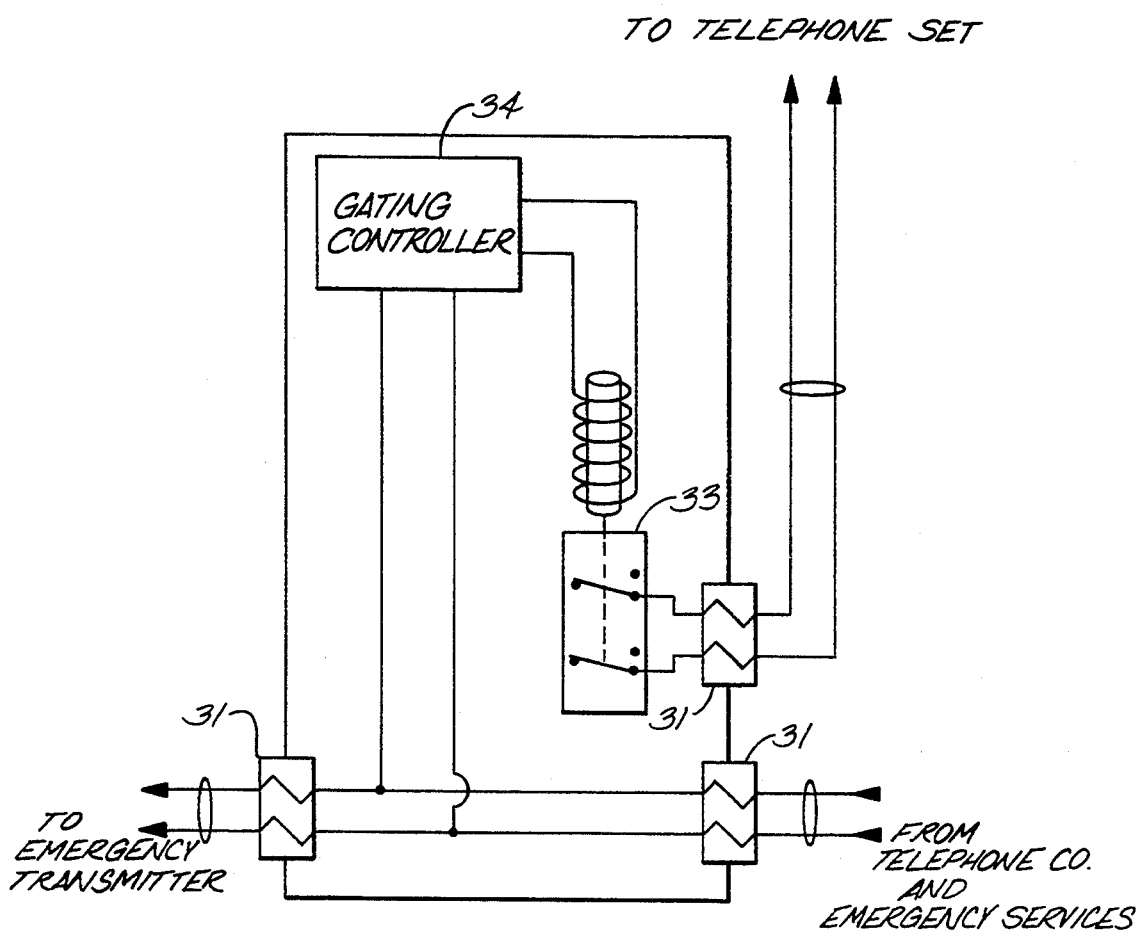

EMERGENCY INFORMATION FACSIMILE TRANSMITTER

FIELD OF THE INVENTION

This invention relates to an apparatus for the selective transmission in facsimile format of previously stored data to a selected emergency service and the subsequent establishment of a voice link between the emergency services and the user.

BACKGROUND OF THE INVENTION

In any given emergency, in order to minimize the loss or damage to life or limb, property or the environment, a prompt response is critical. The reaction time for emergency services such as Fire, Police, Paramedics or (Hazardous Material (HazMat)) Teams, can be significantly reduced when complete and correct information pertaining to the situation is available as soon as the emergency service becomes aware of the emergency. In many cases, insufficient information will not allow a response at all. The establishment of the national 9-1-1 emergency telephone system was a big step toward providing a universal response method for a plethora of emergency situations. However, even with the advent of the 9-1-1 system, voice communication with a live operator is currently the standard means to initiate a request for emergency assistance. Except for any name, address and telephone number information that may appear on the 9-1-1 operator's computer screen, all emergency information must be transmitted verbally.

Verbal transfer of information is prone to be slow, inaccurate, and incomplete. Sometimes such verbal transfer is clearly inappropriate—it would be difficult for one person to provide CPR to a heart attack victim while calling an operator and explaining the situation and it would be dangerous to wait for operator response in a burning building full of toxic materials.

There is thus a need for a device that can automatically transmit all the necessary information required for fast accurate emergency response times. While such an apparatus could be used with any monitoring service, it would be particularly advantageous if it could be used in conjunction with the 9-1-1 system and did not require any additional special purpose equipment at the facility which receives the 9-1-1 call.

There are many prior art emergency data transmitters.

One version, as disclosed in U.S. Pat. No. 4,219,698 to Birilli, transmits a tape recorded aural message to some emergency service. This method is slow, subject to mechanical failure after time, cannot send diagrams or photos and cannot specify discrete messages.

U.S. Pat. No. 4,904,983 to Mitchell, discloses a similar transmitter but with digital encoding added. This invention is subject to the same limitations as above; in addition the receiving stations must be equipped with specialized digital equipment for decoding the signals and therefore limit the universal usefulness of the transmitter.

The devices disclosed in U.S. Pat. No. 4,760,593 to Shapiro, U.S. Pat. No. 3,945,006 to Cleeton, and U.S. Pat. No. 4,284,849 to Anderson et al., all transmit limited digital information that must also be decoded by specially programmed equipment.

U.S. Pat. No. 4,371,751 to Hilligoss, Jr. et al., discloses a device which transmits a very limited number of aural messages that are stored digitally. While not requiring any special receiving equipment, the device is not capable of sending any visual information and only a limited amount of aural information.

Additionally, other types of known emergency signaling systems require that all of the emergency information be stored in advance at the receiving station which is then retrieved when an identifying code is received from the sending station. This, of course, means that data cannot be so easily changed and that the sending station is usable only with a specific receiving station in which the relevant data has already been stored, thereby inhibiting general public use on a large scale.

SUMMARY OF THE INVENTION

An emergency message is communicated from a remote location to an emergency service facility. The emergency message is fed, preferably in graphic format, to a facsimile machine at the remote location. The facsimile machine has an output at which the message appears as an electrical signal. The output of the facsimile machine is coupled to external memory means at the remote location to store the message in the memory means in the form of the electrical signal. A telephone number for the emergency service facility is also stored in the memory means. A receiving facsimile is connected to the telephone system at the emergency service facility. The telephone number stored in the memory means is dialed up responsive to a user command. The message stored in the memory means is transmitted over the telephone system to the receiving facsimile after dial up.

An emergency data apparatus in accordance with the present invention preferably incorporates manually operated switches each corresponding to a specific type of emergency, an autodialer, a data transmitter, and a speakerphone, and preferably is connected to an external telephone handset and keypad. When operated, each switch causes the apparatus to establish a corresponding telephone connection and to transmit in conventional facsimile transmission format, previously stored emergency information to a corresponding public or private emergency service, whereupon the handset and/or speakerphone is activated for aural verification and further information exchange.

The apparatus of the present invention preferably allows separate and distinct blocks of digital information transmitted from any standard facsimile machine to be stored digitally in any of the selectable emergency response key memories. The apparatus can also be equipped to photograph, store the photographic image digitally and retransmit the image along with the emergency information. By utilizing a detachable and positionable digital camera and flash, a photographic image of the person activating the transmitter, machine settings, dials etc., may thus also be transmitted in facsimile format to augment the other emergency information. The variety of information that may be stored is determined only by the user and his application. These blocks of information might contain the exact location of the transmitter specifying the city, street, building, floor, apartment or room number and position within the room, detailed directions to the transmitter site, details of hazardous materials nearby and the instructions for handling the materials, pre-existing hazardous conditions, location of nearest fire hydrants, entrances and exits to the building, gas and electrical shutoff locations, emergency shutdown procedures, pre-existing medical conditions of occupants and their photographs. Thus any handwritten, typed, drawn, printed or computer-generated text and/or graphics that can be transmitted via standard facsimile protocol, can be easily stored in the emergency transmitter awaiting re-transmission at the moment of need. When any combination of specific emergency keys and the main send key are manually activated, the selected blocks of information are sent in the form of a conventional facsimile transmission over standard telephone lines to the appropriate emergency service who will receive and decode the transmission in visible form by means of any standard facsimile machine or facsimile equipped computer system. Upon completion of the data transmission, a speakerphone or other voice link will automatically be established. Because of the ease of replacing large amounts of data in the emergency transmitter using a standard facsimile transmitter, information can be updated and changed whenever necessary.

These advantages are achieved by an apparatus that is preferably operable in any of several user selected modes. Using a multifunction switch, the apparatus can be operated in any of the following modes:

1) 9-1-1 autodialing emergency data facsimile transmission;
2) as in mode 1 but dialing an alternate user encoded number;
3) as in mode 1 but dialing a 2nd alternate number;
4) facsimile reception and digital storage;
5) telephone number reception and storage;
6) test facsimile transmission;
7) self-test and status display; or
8) off.

In mode 1, upon activation of the main send switch, the apparatus will take and store a digital photograph for later transmission; clear the single telephone line to which it is connected; automatically dial 9-1-1; transmit the facsimile data of the selected memory blocks; emit an audible alarm signal during transmission; enable the speakerphone at the completion of the data transmission and disable the alarm; and automatically reset upon receiving an operator generated tone when the voice communication is completed.

In modes 2 and 3, the operation is the same as mode one except that alternate telephone numbers are used.

In mode 4, the apparatus will receive and store facsimile data transmissions in designated memory locations.

In mode 5, the apparatus will receive and store Touchtone representations of alternate telephone numbers in designated memory locations.

In mode 6, the apparatus will transmit the stored facsimile information back to an external facsimile machine (typically the same facsimile machine as was used in mode 4) to confirm its presence in memory.

In mode 7, the central processing unit (CPU) of the emergency apparatus will run a self-test program and then allow the user to determine the current remaining memory capacity on display 2.

In mode 8, the apparatus is turned off.

Preferably, the apparatus contains manual switches for activating the transmission of user stored emergency data through the public telephone network to one or more designated emergency services; signalling circuitry and a speech synthesizer which when used in conjunction with down-line devices will clear a single telephone line for use by the apparatus; an apparatus capable of receiving, storing and autodialing telephone numbers in Touchtone format; an apparatus capable of storing blocks of digital facsimile data in individually addressable electronic or optical memory locations corresponding to user selectable switches; an apparatus capable of storing digital information entered by methods other than facsimile transmissions; an apparatus capable of capturing and storing a real time digital photographic image for retransmission with the other digital facsimile data; an apparatus capable of transmitting selected blocks of previously stored information by facsimile over a telephone line when initiated manually by the user followed by the automatic establishing of a speakerphone link, thus providing the user with a fast, reliable, complete and virtually hands-free method for emergency data transmission together with the ability to quickly and easily update stored information as needed.

BRIEF DESCRIPTION OF THE DRAWINGS

FIG. 5 is an electrical schematic diagram of one of the gating devices B shown in FIGS. 1 and 4.

DETAILED DESCRIPTION OF A PREFERRED EMBODIMENT

In one preferred embodiment, the present invention comprises a digital data transmission apparatus using standard facsimile protocol to transmit by standard telephone lines, previously stored information, to emergency services and then establish a voice link to said services.

Figure 1:
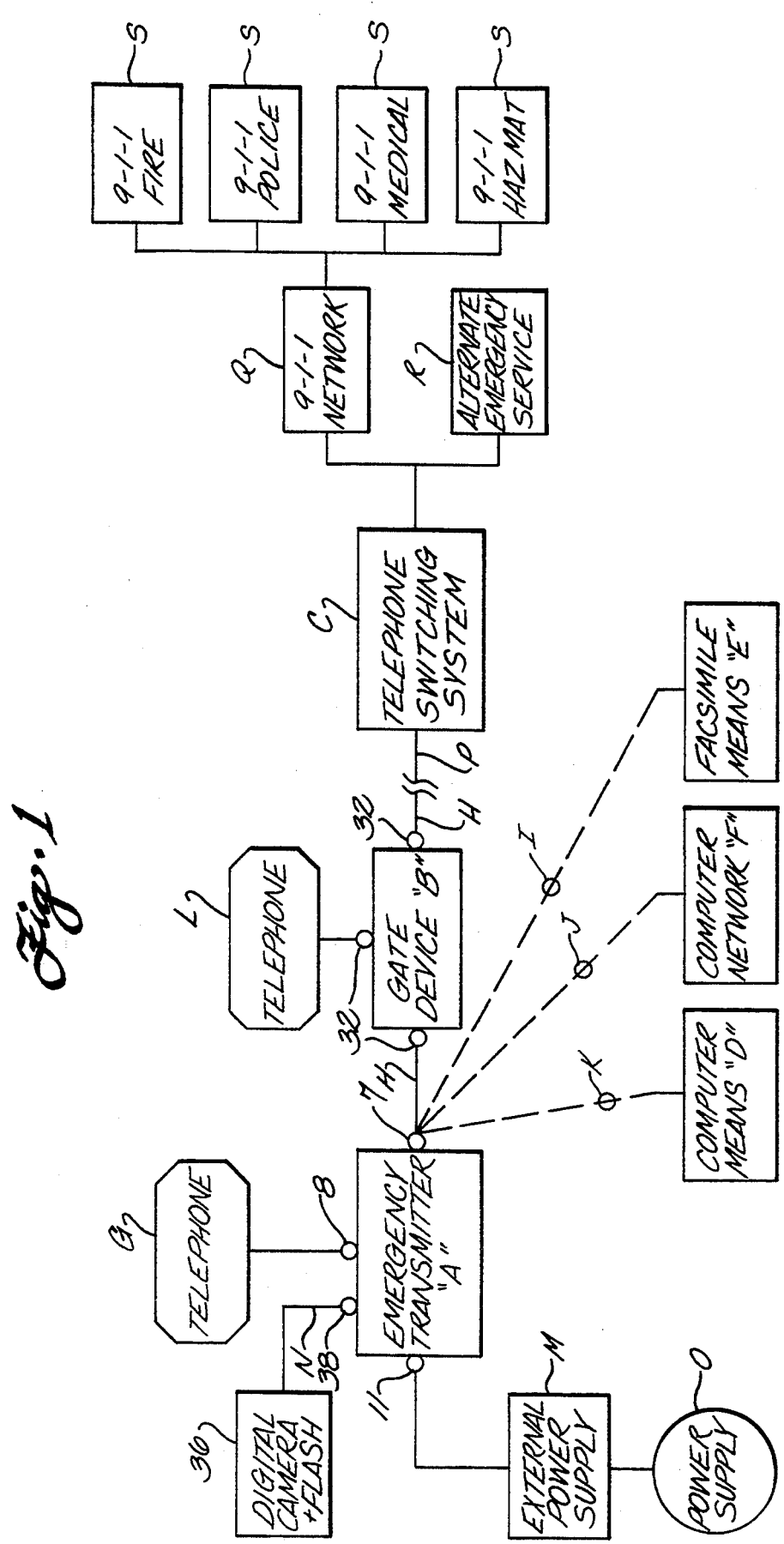
FIG. 1 shows in symbolic form the relationship of an emergency data transmitter A to other elements of an emergency communication system.

FIG. 1 shows in symbolic form the relationship of an emergency data transmitter A to other elements of an emergency communication system. Transmitter A is a stand-alone device requiring no external resources for it to perform its basic operation of transmitting previously stored data in facsimile form by lines H and P to telephone switching equipment C and emergency services Q, R, and S. In normal operation, an external power source M connected at connector 11 and thence to Line voltage source O would provide needed power and to keep back-up batteries charged. If external power is lost, transmitter A will be capable of transmitting all designated information.

Referring to FIG. 1, transmitter A is capable of receiving and storing digital photographs from camera 36 at jack 38; receiving and storing Touchtone representations of telephone numbers from user telephone G at modular jack 8; receiving and storing digital data via facsimile transmission protocol from various devices, i.e. computer D, facsimile machine E, computer network F at modular jack 7; receiving and reacting to reset signals at modular jack 7. Transmitter A is capable of transmitting: any combination of Touchtone dialing signals; transmitting via facsimile protocol, all information stored in its internal storage media from modular jack 7 through telephone circuitry to any location equipped with a standard facsimile receiver; a aural message and a gating signal from modular jack 7.

Figure 2:
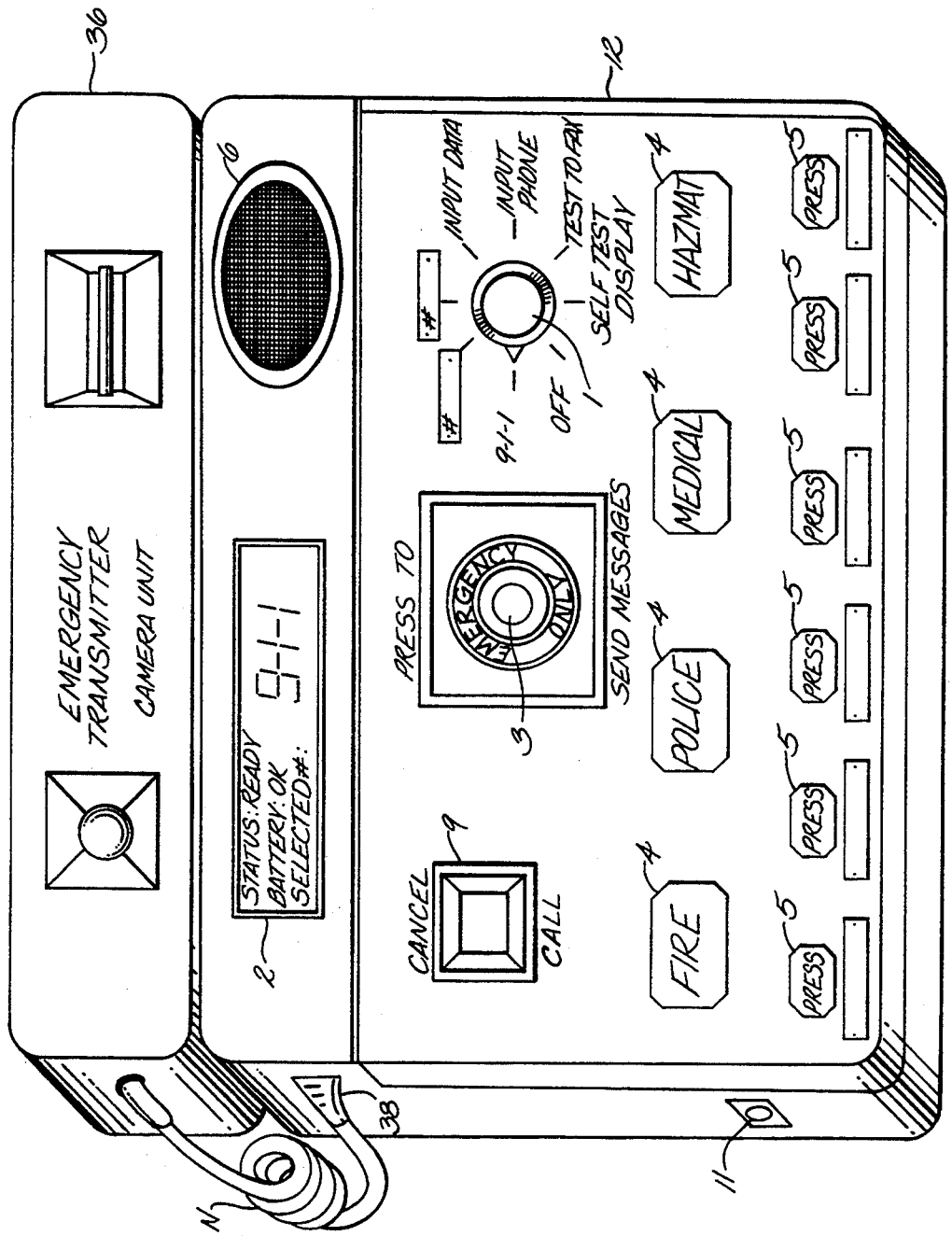
FIGS. 2 and 3 are respectively front and side views of an exemplary physical embodiment for a commercial application.
Figure 3:
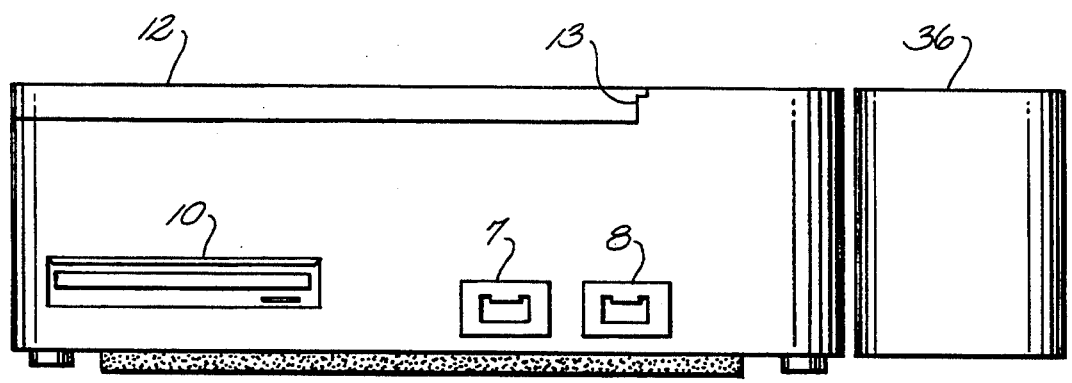

Referring to FIGS. 2 and 3, the apparatus of the invention is shown in an exemplary physical embodiment for a commercial application. It will be noted that alternative arrangements of components and the enlargement or reduction in apparatus capacity are also possible, without departing from the spirit or scope of the invention.

The preferred external embodiment would include provision for the following elements: a multi-position mode switch 1, a display 2, a main activating switch 3 with user-defined data storage, specific emergency message switches 4 with user defined data storage, user-defined data storage switches 5, a speakerphone 6, two modular I/O telephone jacks 7, 8, a cancellation switch 9, a removable data storage device 10, an AC jack 11 for attachment of external power supply, a clear, hinged, protective cover 12, a display illumination device 13, a storage device 14 to hold hard copies of the information digitally stored in the apparatus for future review and updating, a digital camera and flash unit 36. The external features of transmitter A reflect a typical commercial embodiment. Domestic versions will normally be scaled back to reflect simpler needs while more exacting commercial needs may require further expansion of the same basic functions.

Still referring to FIGS. 2 and 3, transmitter A connects to standard telephone lines at modular jack 7 and jack 8, but this does not preclude any adaption to more advanced telephone transmission techniques, i.e. optical and cellular systems. While it is normally expected that transmitter A will be attached to a standard public telephone system, this device is also capable of functioning in any private telephone system (either a stand-alone system, or a private communication system having one or more outside lines connected to the public network).

Figure 4A:
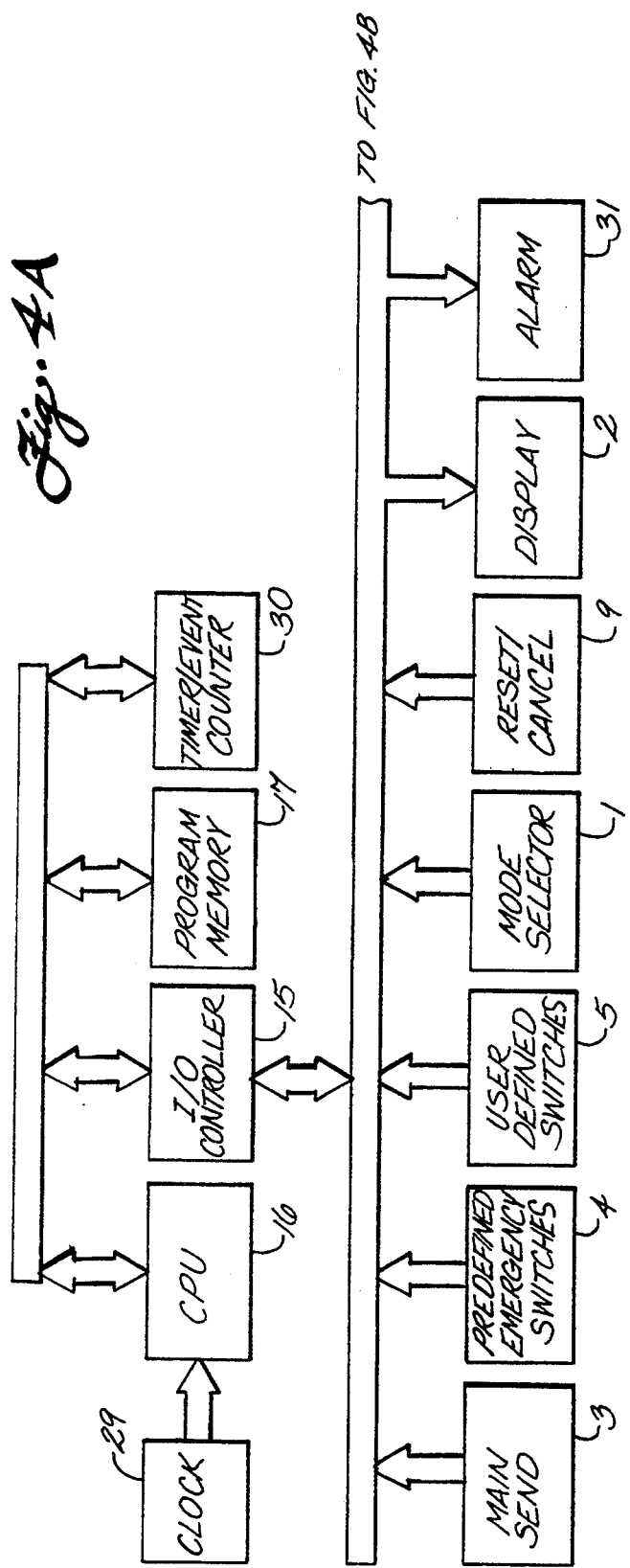
FIGS. 4 (comprising FIG. 4A and FIG. 4B) is a more detailed block diagram of the transmitter A shown in FIG. 1.

Referring to FIGS. 1, 4 and 5, transmitter A utilizes gating device(s) B. While not essential, gating device B enhances the performance of transmitter A by facilitating the acquisition of a clear line for transmission of emergency data.

The internal circuity of the illustrated exemplary embodiment incorporates various electronic or optoelectronic circuitry including but not necessarily limited to the particular components mentioned herein and illustrated in FIGS. 2 and 3 and for the most part is constructed from conventional commercially available circuitry that implements conventional data storage functions, logic functions, facsimile protocol functions, telephone protocol functions, speakerphone functions, alarm functions, data display functions, digital photography functions, gating control functions, with the individual components being conventionally connected together and programmed to accomplish the previously stated objectives and the associated specific functions to be hereinafter described.

Referring to FIGS. 2, 3 and 4, the user may select any of the available modes of operation of the transmitter A by means of mode switches 1.

In normal operation, as will be described in more detail hereinafter with reference to FIG. 6, CPU 16 and its associated I/O controller 15 continuously check the status of the attached telephone line H and send the line status to the display 2. CPU 16 (a programmed microprocessor) sends 9-1-1 to display 2 as the currently selected number in case of emergency activation. I/O controller 15 passively routes normal voice communications to and from a telephone if attached to the transmitter at input jack 8. Users' telephone attached to input jack 8 will be connected directly to output jack 7 except during activation of emergency transmitter A. Power supply 35 supplies regulated power to the transmitter A and to the digital camera and flash from an external AC transformer power source and from internal batteries; and battery and external power source status data is displayed on display 2.

Referring to the preferred embodiment shown in FIGS. 2 and 4, display 2 is for example a Lcd display device. Display 2 will receive various digital status messages from each controller and will display in common language the various stages of activation, programming steps and mode settings.

Still referring to FIGS. 2 and 4, main activating switch 3 is a momentary switch used by the operator to activate transmitter A in any of the various modes as selected. Switch 3, when pressed in modes 1, 2, or 3 begins the standard emergency transmission sequence of a brief request for emergency assistance from Rom memory 26 and one primary block of user stored emergency information stored as digital facsimile data in memory 27 or 28. If no user data is present only the Rom message will be transmitted. Since switch 3 is the main activating switch, switch 3 will be larger and more visible on the face of transmitter A.

The emergency specific switch 4, comprises a bank of momentary switches each of which control the transmission of a brief message from read-only memory 26 concerning the type of emergency, a block of user-stored digital facsimile data and a emergency services suffix number to facilitate the routing of the transmission. If no user data is present only the Rom message and the suffix number will be transmitted. The various emergency specific keys may be identified for FIRE, MEDICAL, POLICE, SILENT ALARM, HAZARDOUS MATERIALS emergencies. One or all of the keys may be activated with their corresponding Rom messages and data blocks being transmitted in sequence. Emergency specific switches may be pressed before or after the switch 3 is pressed, however no data will be transmitted until switch 3 is activated.

User-defined data storage switch 4, comprises a bank of momentary switches, each of which control the transmission of a block of user-stored digital facsimile data. These blocks of data are defined and stored relative to the needs of the user. One or all of the keys may be activated with their corresponding data blocks being transmitted after switch 3 is activated.

Speakerphone 6 is enabled during the aural communication portion of the emergency transmission sequence by the CPU 16. Speakerphone 6 is driven by telephone controller/amplifier 18 into the standard telephone line H.

Cancellation switch 9, upon activation, signals the CPU 16 to interrupt the emergency transmission sequence. When the CPU 16 receives the interrupt signal, it in turn through the I/O controller 15 discontinues transmission of user-stored facsimile data and transmits a short notice of cancellation to emergency services and enables the speakerphone for verification of the need to cancel the transmission. If the telephonic connection has not yet been made, the CPU 16 will terminate all automatic sequences and reset the transmitter A to the ready state.

Disk drive 10 functions as a removable memory device which allows the rapid exchange of user-defined data via floppy magnetic disk, optical disk or any portable data storage device as may be convenient in manufacture. Drive 10 is a preferred means for data storage and exchange, but internal EPROMs and ROMs alone can supply the sufficient data storage for all essential operations of the transmitter A. Ideally, the use of exchangeable data storage devices will allow a computer to generate updates for all the users' emergency transmitters making it even easier to update user-stored information. It is noted that individual computer D connected with a modem on line K or in concert with computer networks F and modem line J that user-stored information may be updated directly through the telephone lines to which each transmitter is connected.

Referring now to FIGS. 2, 3 and 4, modular female telephone jack 7, 8 allow the standardized connection of transmitter A with the user's telephone at modular jack 8 and an active standard telephone circuit at modular jack 7. External AC jack 11 allows connection of an external power source to power supply 17.

As shown in FIGS. 2 and 3, transmitter A operating panel is covered by protective cover 12 in the form of a sturdy translucent, close-fitting shield, for preventing the accidental activation of the transmitter and for excluding contaminants that may affect the proper operation of the transmitter A. Protective cover 12 is hinged at the top and incorporates an interlock switch for the energizing of the panel illumination 13 to assist in the reading of the various panel switches and the display 2 when the cover 12 is raised.

Referring to FIG. 3, storage pocket 14 is a storage area for the keeping of hard copies of data that is stored by the user in transmitter A memory means.

As shown in FIGS. 1, 4 and 5, gate device B is a separate device from transmitter A that is placed between any telephonic device and the telephone line H to which transmitter A is also attached. Gate device B is powered by telephone circuit voltages and will upon receiving a gating signal from transmitter A, disconnects any telephonic device that is attached to it from telephone line H. When the gating signal is discontinued, gating device B will reconnect its telephonic device. Gating device B is activated by an inaudible gating signal that will not interfere with any data transmission.

Referring to FIG. 4, Alarm 31 generates any combination of visual or aural signals to the user to indicate that the transmitter A has been activated. Alarm 31 is activated by I/O Controller 18 during the line acquisition and data transmission sequence following transmitter A activation. Alarm signals are discontinued during the aural connections to emergency services or during any input or test modes.

Referring to FIGS. 1, 2, and 4, digital camera and flash 36 utilizes known digital camera circuitry to store a picture in digital memory 37. Digital camera and flash 36 is modular and may be positioned as needed by user to record any circumstances that may provide needed information to emergency services. Camera and flash 36 receives power and digital communications through Cable N and connector 38. Digital camera and flash 36 is not essential to the basic operation of emergency transmitter A and may be left out on simpler models.

In mode 1 of operation, as shown in FIG. 6, the system checks power levels and devices and if the system and devices are ready (step 1.1), it then issues appropriate prompts to the user and waits for either the emergency key (step 1.2) or the send key (step 1.2a) to be activated. Following the activation of the appropriate key, transmitter A then preferably performs a series of automatic steps as follows:

1.3 Digital camera 36 immediately takes a photograph of the person activating the transmitter or the selected object as directed by the same person. The photograph is stored in digital memory 37.

1.4 The connected telephone is disconnected by the I/O 15;

1.5 Telephone controller 18 seizes the telephone line and determines the ready status by sensing for the standard dial tone;

1.6 If the dial tone is present, the gating signal circuit 19 will begin transmitting an inaudible signal into telephone line H, triggering gating device B to disconnect any attached devices thereby preventing any so equipped telephonic devices from interfering with data transmission on that line only;

1.7 Automatic dialer 20 dials 9-1-1; if any of the emergency specific switches 4 are also activated, a suffix number will be added to further route the emergency call to the proper service;

1.8 I/O controller 15 senses for a ring cycle; if the I/O controller 15 senses the ring cycle, the I/O controller 15 will allow the ring cycle to continue until the line is answered or a specified number of rings as counted by the Timer/Event Counter 30, signals the I/O Controller 15 to disconnect from the telephone line H and send an incomplete status message to display 2;

1.9 If the line is answered, the facsimile controller 24 begins the standard facsimile transmission sequences to establish a communications link;

1.10 Once the link has been established, the CPU 16 will then coordinate the orderly transmission of stored data specified by the user activation of transmitter switches 3, 4, 5, and the digital photograph by facsimile;

1.11 When all data has been transmitted the I/O controller 15 sends a transmission complete message to display 2;

1.12 Once the facsimile transmission has been successfully completed, the system turns off the audible alarm to allow the user to establish voice contact with the emergency service.

1.13 Gating signal circuit 19 discontinues its signal, allowing the gating devices B to reconnect their respective devices to line H;

1.14 I/O controller 15 holds the line open for an aural response by emergency services and activates the speakerphone 6;

1.15 At the end of conversation or if emergency services are unable to respond verbally, emergency services will send a tone burst corresponding to the "*" key on a standard telephone thereby signalling the telephone controller 18 which in turn signals the CPU 24 to reset the emergency transmitter to a waiting state and to send a "transmission complete" to display 2.

In step 1.5, if the telephone controller 18 determines that telephone line H is in use:

1.5a voice synthesizer 22 generates a brief aural message from Message Rom 23 which is inserted into the active telephone line H by the telephone controller 18, thereby informing users of the emergency status;

1.5b I/O controller 15 waits a specified amount of time.

1.5c If no dial tone is present, the gate signal circuit 19 is enabled which in turn activates gating device B to disconnect all users;

1.5d I/O controller 15 will index Timer/Event Counter 30 for determining total number of line seizure attempts, up to a predetermined maximum, whereupon the system resets. On the other hand, if the dial tone is present, the I/O controller 15 begins the line acquisition sequence at step 1.6. If a busy signal is encountered in step 1.8, the I/O controller 15 will proceed as follows:

1.8a Telephone controller 18 will disconnect from the telephone line; CPU 24 will wait a specified period of time as calculated by the clock circuit 29; I/O controller 15 will index the Timer/Event Counter 30 for determining the total number of attempts to connect; If the I/O controller 15 has not reached a predetermined number in the register, the sequence will begin again at step 1.7. If the register has accumulated to a predetermined number the I/O controller 15 will signal the CPU 16 to reset the transmitter to a waiting state.

In the event the device is not able to verify the transmission is complete, controller 15 will send an incomplete transmission message to display 2 (step 1.11a).

In mode 2, the transmitter will function exactly as in mode 1 except that the automatic dialer 20 will dial a user-encoded number stored in memory 21 rather than 9-1-1 (block 1.5a).

In mode 3, the transmitter will function exactly as in mode 2 except that the automatic dialer 20 will dial a second user encoded number stored in memory 21.

In mode 4, as shown in the flowchart of FIG. 7, the transmitter A will accept facsimile data into its internal memory 26 and/or 28 in the following steps.

4.1 The user will directly connect the transmitter A to external facsimile machine E by way of telephone jack 7;

4.2 The user will depress any one of the emergency data keys 3, 4, or 5, causing the CPU 16 to display the memory available for the corresponding key and at the same time, enabling facsimile data to be stored in its address in memory;

4.3 The user will transmit documents bearing emergency information from facsimile E through line I;

4.4 Facsimile controller 24 will acknowledge all standard facsimile transmission protocol and accept transmission of data from facsimile E;

4.5 CPU 16 routes the digital data through memory controller 25 to the appropriate addresses in memory 27 and/or 28, overwriting any existing data at that address;

4.6 At the completion of transmission, the facsimile controller 24 will terminate the data link;

4.7 I/O controller 15 will send a data received message to display 2.

In mode 5, as shown in FIG. 8, the transmitter A will accept and store the alternate telephone numbers for use in modes 2 or 3.

5.1 The system determines that the user has connected a standard telephone to jack 8 and places the telephone line in the off-hook status;

5.2 Telephone communications controller 18 energizes the telephone G and provides a confirming tone to user as well as a visible prompt;

5.3 In response to the displayed prompt the user dials a 1 corresponding to mode 2 or the number 2 to store a second number in the mode 3 position;

5.4 The user then dials a pound symbol followed by the full telephone number followed by a second pound symbol, whereupon telephone controller 18 stores the tone representation in telephone memory 21;

5.5 Telephone controller 18 sends the stored number representations to display 2 for user confirmation.

In mode 6, as shown in FIG. 9, the user may retransmit the stored data to an external facsimile receiver E connected at output jack 7 to confirm its presence in memory.

6.1 The system checks that transmitter A is connected to facsimile E through jack 7 and line I;

6.2 Transmitter is activated by pressing any of the panel switches 3, 4 and 5;

6.3 Telephone communications controller 18 establishes a normal telephone circuit connection with facsimile E;

6.4 Facsimile controller 24 will acknowledge standard facsimile protocol from facsimile E;

6.5 CPU 16 coordinates the transmission of all selected data in memory through facsimile controller 24 to facsimile E;

6.6 When transmission is complete and a confirmation signal is received, I/O controller 15 sends a transmission complete message to display 2.

In mode 7, as shown in FIG. 10, the CPU 16 will perform a diagnostics routine on all devices (block 7.1), determine the status of the low power circuits including remaining capacities in user defined memories and then, if sufficient external power is available, test the other peripheral units (block 7.2) and display all results on display 2.

In mode 8, transmitter A is shutdown. All memories are nonvolatile requiring no maintenance voltage levels. As shown in FIG. 11, if even a minimum level of internal standby power is available, a user prompt is displayed (block 8.1).

Although the invention has been described with particular reference to a presently preferred embodiment especially suitable for a commercial building in which hazardous waste is stored, it will be appreciated that a simpler embodiment will be suitable for less stringent applications. For example, the apparatus may implement only mode 1, in which case the same number (9-1-1 possibly followed by a suitable suffix) is always associated with any type of emergency, or the apparatus may transmit the same stored information regardless of the type of emergency.

Another application for the present invention would be in the transportation of hazardous materials, in which case the data stored in the memory would include a hazardous materials manifest, and the connection between the transmitter and the emergency would be by means of a conventional mobile cellular telephone transmitter and receiver.

What is claimed is:

1. An emergency data telephone apparatus for transmitting in conventional facsimile transmission format previously stored emergency information to a corresponding previously designated emergency service, said apparatus comprising:

a plurality of manually operated switches each corresponding to a different type of emergency;

first correlation means for correlating each of said switches with a respective emergency number;

second correlation means for correlating each said switches with respective emergency data;

an autodialer;

a memory for storing said respective emergency data in facsimile message format;

an autodialer responsive to an activated one of said switches for establishing a telephone connection to at least one said respective emergency number correlated with said activated switch;

a facsimile data transmitter responsive to said activated switch, to said autodialer, to said second means and to said memory for transmitting the particular emergency data correlated with said activated switch after said autodialer has established said telephone connection;

means for sensing the end of transmission of the particular emergency data;

a digital camera and flash unit for recording into said memory a contemporary visible condition or event as part of said emergency data;

a voice transmit and receive circuit; and transfer means responsive to said sensing means for connecting said voice transmit and receive circuit to said telephone connection after said respective emergency information has been transmitted to said emergency number.

2. The apparatus of claim 1 wherein said visible condition or event is a image of the person activating the transmitter.

3. The apparatus of claim 1 further comprising a function selector for placing the apparatus in a selected one of a plurality of user modes.

4. The apparatus of claim 3 further comprising a display for appraising a user of the current mode, status and configuration of the emergency data apparatus.

5. An emergency data telephone apparatus for transmitting in conventional facsimile transmission format previously stored emergency information to a corresponding previously designated emergency service, said apparatus comprising:

a plurality of manually operated switches, said plurality of switches further comprising a main alarm activation switch and at least one emergency specific switch;

first correlation means for correlating each of said switches with a particular emergency service;

second correlation means for correlating each of aid switches with a particular type of emergency;

an autodialer;

a first memory for storing telephone connection data for each said particular emergency service;

a second memory for storing emergency information data in facsimile message format for each said type of emergency, said second memory further comprising a plurality of removable solid state memories for storing digital facsimile representations of relevant data in separate addressable locations;

an autodialer responsive to an activated on of said switches, to said first means and to said first memory for establishing a telephone connection to at least one said particular emergency service correlated with said activated switch, said autodialer further comprising:

a user keypad and a telephone dialer circuit responsive to said keypad for accepting a digital representation of a first sequence of activations of individual keys of said keypad and storing said digital representation in a location of said first memory designated by a second sequence of one or more keys of said keypad;

a facsimile data transmitter responsive to said activated switch, to said autodialer, to said second means and to said second memory for transmitting the particular emergency information data correlated with said activated switch after said autodialer has established said telephone connection;

a voice transmit and receive circuit;

transfer means responsive to said facsimile data transmitter for connecting said voice transmit and receive circuit to said telephone connection after said particular emergency information has been transmitted to said particular emergency service;

a fax controller circuit for receiving and storing facsimile data from an external facsimile transmitter;

a function selector for placing the apparatus in a selected one of a plurality of user modes;

a digital camera and flash unit for recording into an associated memory a contemporary visible condition or event; and a display for appraising a user of the current mode, status and configuration of the emergency data apparatus.

6. The apparatus of claim 5 wherein said visible condition or event is an image of the person activating the transmitter.

* * * * *